United States Patent [19]

Chang

[11] Patent Number: 5,706,760
[45] Date of Patent: Jan. 13, 1998

[54] AQUARIUM ADAPTED TO BE HUNG ON A STATIONARY WALL

[75] Inventor: Johnson Chang, Taipei Hsien, Taiwan

[73] Assignee: Li Way Industrial Co., Ltd., San-Chung, Taiwan

[21] Appl. No.: 609,778

[22] Filed: Mar. 1, 1996

[51] Int. Cl.$^6$ ............................................. A01K 63/00
[52] U.S. Cl. ..................................................... 119/257
[58] Field of Search ............................... 119/245, 246, 119/247, 248, 249, 253, 255, 257

[56] References Cited

U.S. PATENT DOCUMENTS

| | | | |
|---|---|---|---|
| D. 41,977 | 12/1911 | Jacob | 119/257 X |
| 1,777,944 | 10/1930 | Trovato | 119/257 X |
| 1,974,068 | 9/1934 | Greensaft | 119/257 |
| 3,276,428 | 10/1966 | Burch | 119/257 |
| 4,353,327 | 10/1982 | Shroyer | 119/257 |

*Primary Examiner*—Gene Mancene
*Assistant Examiner*—Thomas Price

*Attorney, Agent, or Firm*—Christensen O'Connor Johnson & Kindness PLLC

[57] ABSTRACT

An aquarium includes a container to receive water and live fish therein, and a hanging unit by which the container is adapted to be hung on a stationary wall. The container includes a vertical rectangular rear wall, a horizontal rectangular bottom wall, two trapezoid side walls, and a downwardly and rearwardly inclined rectangular front wall with a transparent piece fitted sealingly therein. Each of the trapezoid side walls has a vertical rear side coupled with the rear wall, a horizontal bottom side coupled with the bottom wall, a horizontal top side which is longer than the bottom side, and an inclined front side coupled with the front wall. The hanging unit includes two hanging holes formed through the rear wall of the container, and two hooks which extend through the hanging holes to fasten on the stationary wall so as to hang the aquarium on the stationary wall. A decorative frame is attached on and around the periphery of the container in such a manner that a portion of the transparent piece is exposed from the decorative frame so that water and live fish are visible through the transparent piece. The assembly of the transparent piece, the decorative frame, water and fish cooperatively simulates a live picture.

1 Claim, 3 Drawing Sheets

AQUARIUM ADAPTED TO BE HUNG ON A STATIONARY WALL

BACKGROUND OF THE INVENTION

1. Field of the Invention

The invention relates to an aquarium, more particularly to one which is adapted to be hung on a stationary wall.

2. Description of the Related Art

A conventional aquarium is usually placed in a drawing room so as to provide recreation effects to the occupants. In view of limited space in the drawing room, a substitute place for accommodation of the aquarium without affecting the recreation values highly desirous.

SUMMARY OF THE INVENTION

It is an object of this invention to provide an aquarium which is adapted to be hung on a stationary wall so as to provide recreation effects thereof.

Another object of this invention is to provide an aquarium on which a decorative frame can be hung therearound in such a manner that the decorative frame covers the periphery of the aquarium, thereby exposing a transparent portion of the front wall of the aquarium so that water and live fishes in the aquarium are visible. Thus, assembly of the transparent portion of the front wall, the decorative frame, water and fish cooperatively simulates a live picture.

Accordingly, an aquarium of this invention adapted to be hung on a stationary wall so that water and live fish can be received therein. The aquarium includes a container having a vertical rectangular rear wall, a horizontal rectangular bottom wall, two trapezoid side walls, and a downwardly and rearwardly inclined rectangular front wall with a transparent piece fitted sealingly therein. Each of the trapezoid side walls has a vertical rear side coupled with the rear wall, a horizontal bottom side coupled with the bottom wall, a horizontal top side which is longer than the bottom side, and an inclined front side coupled with the front wall. The hanging unit includes two hanging holes formed through the rear wall of the container, and two hooks which extend through the hanging holes to fasten on the stationary wall so as to hang the aquarium on the stationary wall. A decorative frame is attached on and around the periphery of the container in such a manner that a portion of the transparent piece is exposed from the central hole of the frame so that water and live fish are visible through the transparent piece. The assembly of the transparent piece, the decorative frame, water and fish cooperatively simulates a live picture.

BRIEF DESCRIPTION OF THE DRAWINGS

Other features and advantages of this invention will become more apparent in the following detailed description of the preferred embodiment with reference to the accompanying drawings, in which.

DETAILED DESCRIPTION OF THE PREFERRED EMBODIMENT

Figure 1:
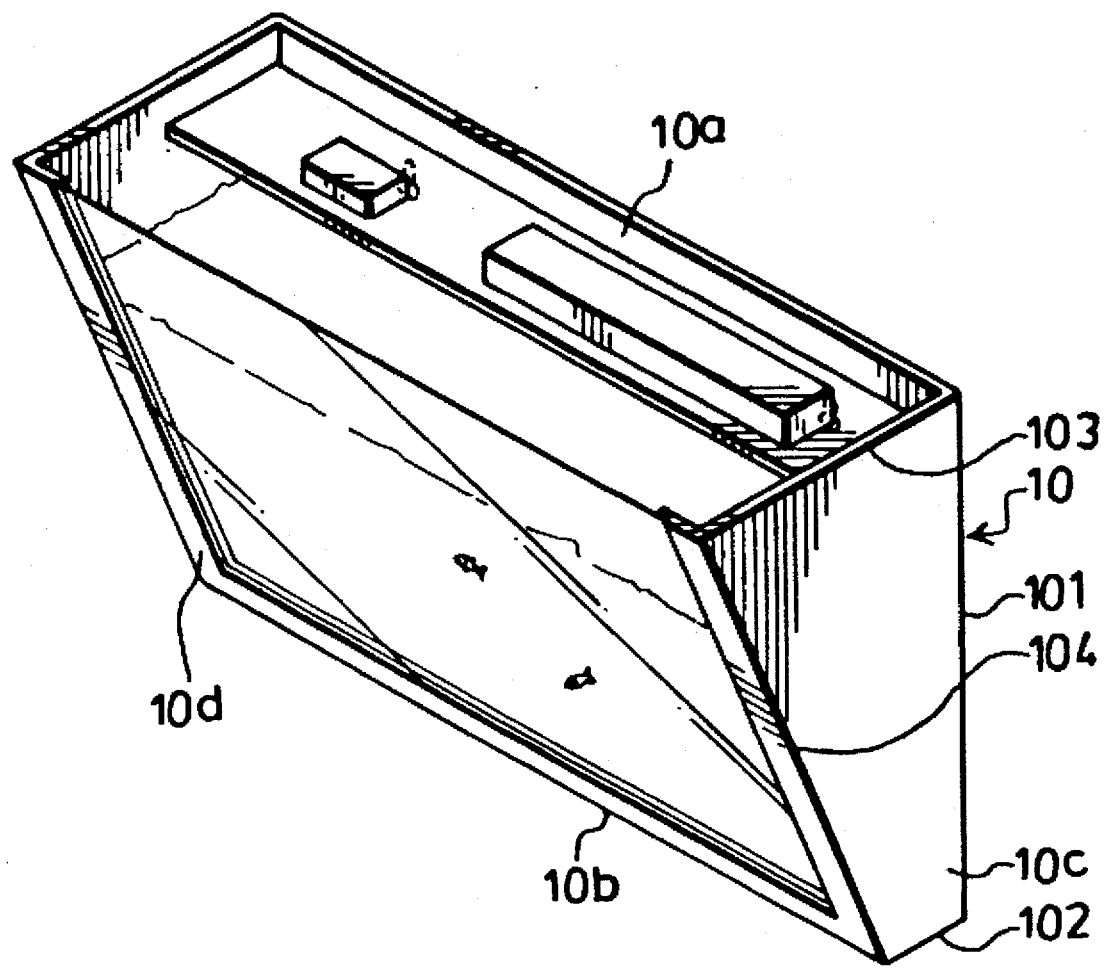
FIG. 1 is a perspective view of an aquarium of this invention.
Figure 2:
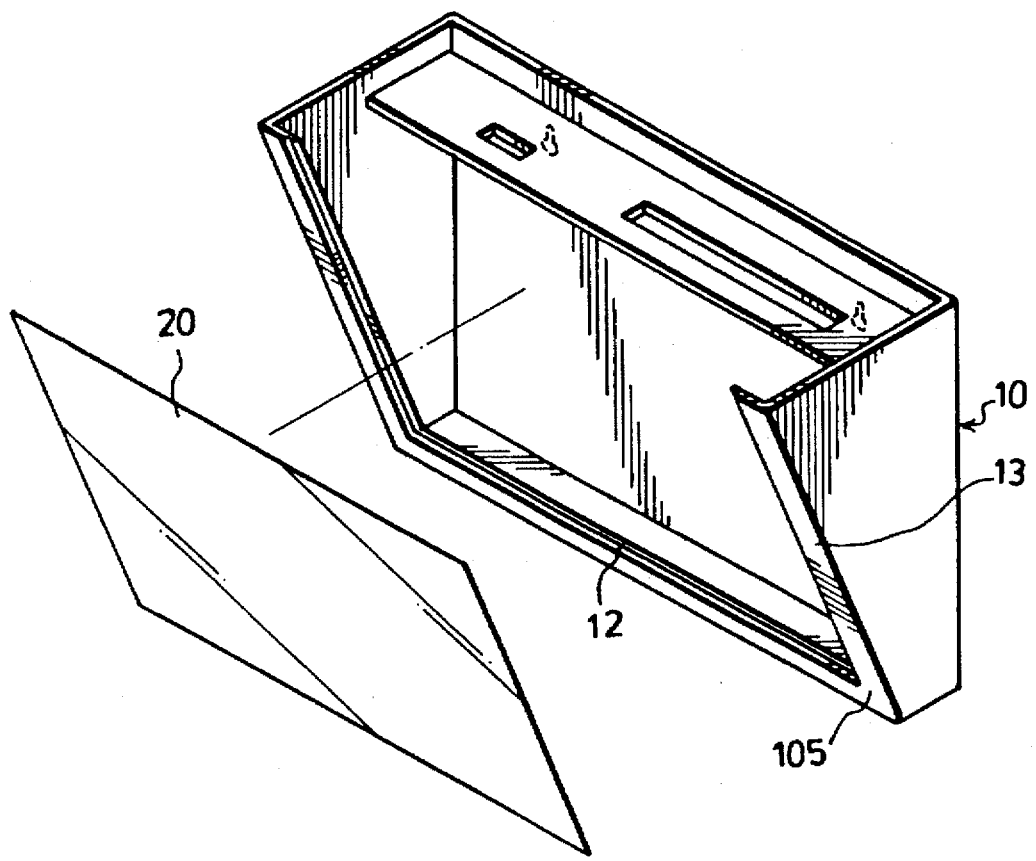
FIG. 2 is an exploded view of the aquarium according to this invention.

Referring to FIGS. 1 and 2, a preferred embodiment of an aquarium according to this invention is shown and adapted to be hung on a stationary wall so that water and live fish can be received therein.

Figure 3:
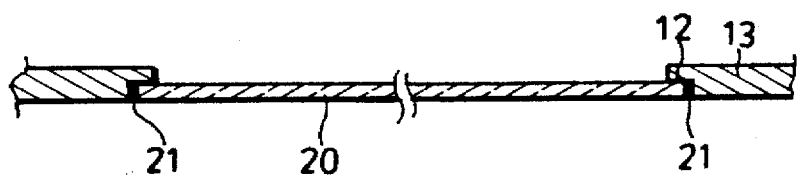
FIG. 3 is a sectional view of a portion of the aquarium according to this invention, illustrating how a transparent glass piece is mounted on the aquarium so as to view the live fish through the glass piece.

As illustrated, the aquarium includes a container 10 which has a hanging unit for mounting the same on the stationary wall (not shown). The container 10 includes a vertical rectangular rear wall 10a, a horizontal rectangular bottom wall 10b, two vertical trapezoid side walls 10c, and a downwardly and rearwardly inclined rectangular front wall 10d which consists of a U-shaped frame 13 and a rectangular transparent piece 20. In this preferred embodiment, the rear wall 10a, the side walls 10c and the bottom wall 10b and the U-shaped frame 13 are integrally formed from an acrylic material. Each of the trapezoid side walls 10c has a vertical rear side 101 coupled integrally with the rear wall 10a, a horizontal bottom side 102 coupled integrally with the bottom wall 10b, a horizontal top side 103 longer than the bottom side 102, an inclined front side 104 coupled integrally with the U-shaped frame 13. The frame 13 has an outer periphery 105 integrally formed with the bottom wall 10b and the side walls 10c, and an inner peripheral surface with a slot 12 formed along the total length thereof. As shown in FIG. 3, the periphery of the transparent piece 20 is applied with silicon adhesive 21 and then is inserted into the slot 12 of the frame 13 in such a manner that a liquid-tight seal is established between the frame 13 and the transparent piece 20 upon hardening of the adhesive 21. The transparent piece 20 may be made from glass or acrylic.

Figure 4:
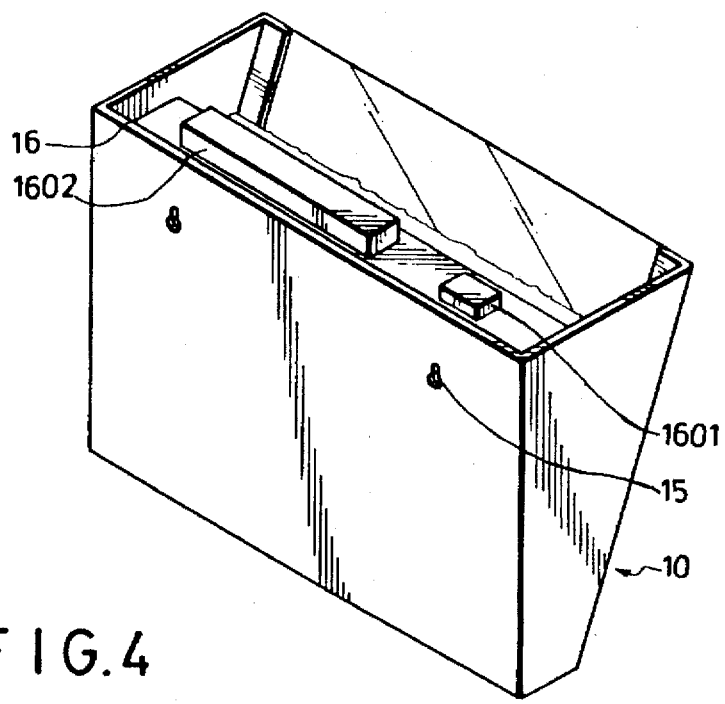
FIG. 4 showing the aquarium of this invention viewed from a rear side, illustrating hanging unit of the aquarium.

Referring to FIGS. 4, the hanging unit includes two hanging holes 15 formed through an upper section of the rear wall 10a (see FIG. 1) so that two hooks (not shown) can extend through the holes 15 so as to fix the container 10 on the stationary wall. The container 10 further has a horizontal mounting plate 16 fixed on the upper section of the rear wall 10a (see FIG. 1). A hand pump 1601 for pumping air into the water, and an electrical lamp 1602 are mounted on the mounting plate 16.

Figure 5:
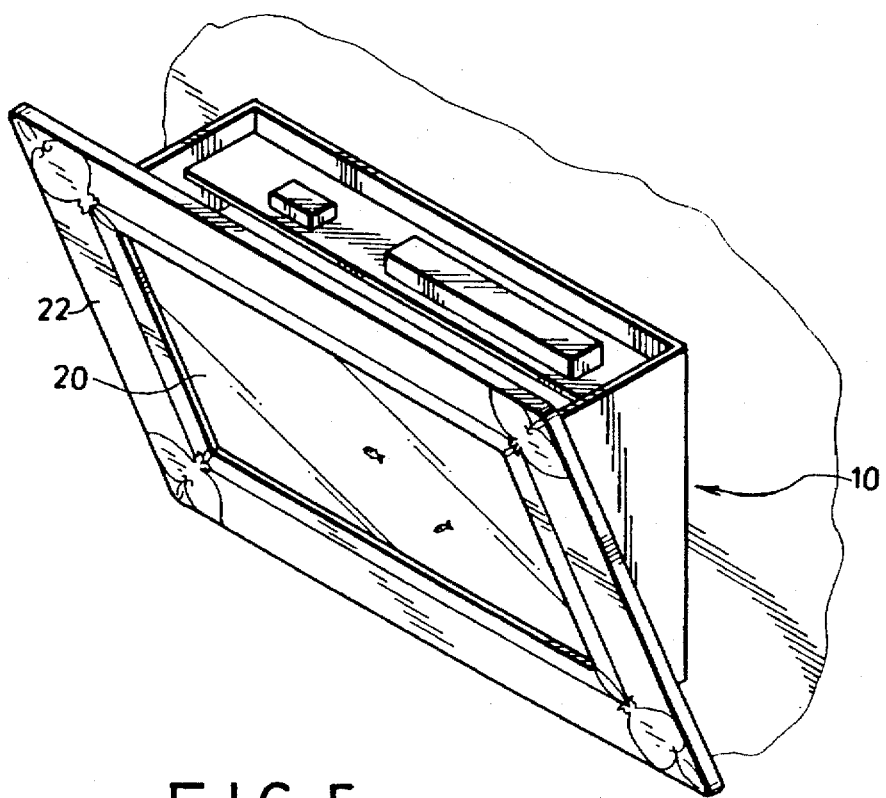
FIG. 5 is a perspective view of the aquarium of this invention provided with a decorative frame so that the whole assembly simulates as a live picture.

Referring to FIG. 5, the container 10 of the invention is further provided with a rectangular decorative frame 22 which has a rectangular central hole defined therein and which is attached on and around the periphery of the container 10 so as to cover the same except for the transparent piece 20. Thus, assembly of the transparent piece 20, the decorative frame 22, water and fish simulates a live picture.

It can be appreciated that because the front wall 10d of the container 10 is inclined, the fish in the container 10 can be seen by a viewer who stands below the aquarium of this invention.

With this invention thus explained, it is obvious to those skilled in the art that various modifications and variations can be made without departing from the scope and spirit thereof. Therefore, the invention is to be limited only as in the appended claims.

I claim:

1. An aquarium adapted to be hung on a stationary wall so that water and live fish can be received therein, said aquarium comprising:

a container having a hanging unit whereby said container is adapted to be hung on the stationary wall, said container including a vertical rear wall, a horizontal rectangular bottom wall, two vertical trapezoid side walls, and a downwardly and rearwardly inclined rectangular front wall, each of said trapezoid side walls having a vertical rear side coupled with said rear wall, a horizontal bottom side coupled with said bottom wall, a horizontal top side longer than the bottom side, and an inclined front side coupled with said front wall, said rear wall, said side wall and said bottom wall being integrally formed, and said front wall including a rectangular transparent piece in a U-shaped frame which has an outer periphery integrally formed with said bottom wall and said side walls, and an inner peripheral surface with a slot formed along the total length thereof so as to insert a periphery of said transparent piece into said slot, in such a matter that a liquid-tight seal is established therebetween;

a decorative frame attached on and around a periphery of said container in such a manner that said decorative frame defines a central hole for exposing said transparent piece of said front wall in said central hole so that water and the live fish are visible through said transparent piece.

* * * * *

UNITED STATES PATENT AND TRADEMARK OFFICE
CERTIFICATE OF CORRECTION

PATENT NO. : 5,706,760
DATED : January 13, 1998
INVENTOR(S) : J. Chang

It is certified that error appears in the above-identified patent and that said Letters Patent is hereby corrected as shown below:

COLUMN    LINE

[57]    Abstract    "wail," should read --wall,--
Pg. 1, col. 2    line 4 of text 4    2    "matter" should read --manner--
(Claim 1,  line 21)

Signed and Sealed this

Eighteenth Day of August, 1998

Attest:

BRUCE LEHMAN

Attesting Officer    *Commissioner of Patents and Trademarks*